United States Patent

Nakamura et al.

[11] Patent Number: 5,439,748
[45] Date of Patent: Aug. 8, 1995

[54] WATER-SOLUBLE OR WATER-DISPERSIBLE PRESSURE-SENSITIVE ADHESIVE TAPE

[75] Inventors: Koichi Nakamura; Naoki Matsuoka; Toshiharu Konishi; Kenji Sano; Hiroshi Wada, all of Osaka, Japan

[73] Assignee: Nitto Denko Corporation, Osaka, Japan

[21] Appl. No.: 165,494

[22] Filed: Dec. 13, 1993

Related U.S. Application Data

[62] Division of Ser. No. 943,477, Sep. 11, 1992, abandoned.

[30] Foreign Application Priority Data

Sep. 12, 1991 [JP] Japan .................................. 3-263066

[51] Int. Cl.⁶ ........................ B32B 27/10; B32B 27/08
[52] U.S. Cl. ................... 428/511; 428/411.1; 428/483; 428/514; 526/287
[58] Field of Search ..................... 428/511, 411.1, 500, 428/515, 514, 520, 522, 523

[56] References Cited

U.S. PATENT DOCUMENTS 2,838,421 6/1958 Sohl .
4,977,059 12/1990 Liang ................................. 526/287

FOREIGN PATENT DOCUMENTS 4923813 6/1974 Japan .
5222768 6/1977 Japan .
2120381 5/1990 Japan .
257110 12/1990 Japan .

Primary Examiner—Christopher Henderson
Attorney, Agent, or Firm—Sughrue, Mion, Zinn, Macpeak & Seas

[57] ABSTRACT

A water-soluble or water-dispersible pressure-sensitive adhesive composition comprising a sulfonate-containing copolymer obtained from 20 to 99% by weight of an alkoxyethyl acrylate, 1 to 30% by weight of a styrenesulfonic acid salt, and up to 50% by weight of a monomer mixture of acrylic acid-caprolactone adducts. The composition exhibits excellent pressure-sensitive adhesion while showing satisfactory water solubility or dispersibility even in an acidic aqueous solution.

10 Claims, No Drawings

WATER-SOLUBLE OR WATER-DISPERSIBLE PRESSURE-SENSITIVE ADHESIVE TAPE this is a Divisional of Application Ser. No. 07/943,477, filed Sep. 11, 1992, now abandoned.

FIELD OF THE INVENTION

This invention relates to a water-soluble or water-dispersible pressure-sensitive adhesive composition. More particularly, it relates to an adhesive composition which always exhibits pressure sensitivity while showing solubility or dispersibility in water.

BACKGROUND OF THE INVENTION

Water-soluble adhesives are well known as in adhesive tapes comprising a support having applied thereon glue, dextrin, polyvinyl alcohol, etc. These water-soluble adhesives have no self-adhesiveness in a dry state due to lack of rubbery elasticity and viscosity and are made adhesive for the first time on application of water. Therefore, there must be a complicated wetting apparatus for an industrial use of these adhesives. In general use, for example, in stamps or envelopes, too, wetting the adhesive on every use is troublesome.

Developments have also been made on water-soluble or water-dispersible adhesives which always exhibit pressure-sensitive adhesion. For example, U.S. Pat. No. 2,838,421, JP-B-50-84578, JP-B-52-22768, JP-B-49-23813, and JP-B-2-57110 (the term "JP-B" as used herein means an "examined published Japanese patent application") disclose pressure-sensitive adhesives comprising, as a base polymer, a water-soluble polymer, such as a carboxyl-containing polymer, e.g., polyacrylic acid, or an alkali metal salt, an amine salt or an alkanolamine salt thereof, having incorporated therein a water-soluble or water-dispersible plasticizer, such as a polyether polyol, a polyhydric alcohol, or an alkanolamine salt of oxidized rosin. In all these adhesives, water-solubility or water-dispersibility is obtained by using a base polymer prepared from a monomer containing a strongly polar functional group (carboxyl group) in the molecule thereof. Since such a water-soluble or water-dispersible polymer has a high glass transition temperature (Tg) and therefore does not exhibit sufficient pressure-sensitive adhesion at room temperature when used alone, a large quantity of the above-described water-soluble or water-dispersible plasticizer, e.g., polyether polyol or a polyhydric alcohol, is added thereto to obtain desired pressure-sensitive adhesion.

On the other hand, JP-A-2-120381 (the term JP-A" as used herein means an "unexamined published Japanese patent application") suggests to use, as a base polymer, a carboxyl-containing polymer having a low Tg which is prepared from an acrylic acid-caprolactone adduct to provide a water-soluble or water-dispersible pressure-sensitive adhesive which exhibits sufficient pressure-sensitive adhesion with a reduced amount of a water-soluble or water-dispersible plasticizer.

The above-described known water-soluble or water-dispersible pressure-sensitive adhesives have been developed chiefly for use in bonding of paper or broken pieces of paper in the field of paper manufacturing. This is because adhesion workability can be improved by pressure adhesion and also because such an adhesive can easily be dissolved or re-dispersed in water when broke is reduced to pulp.

However, the conventional water-soluble or water-dispersible pressure-sensitive adhesives generally have poor water-solubility or water-dispersibility in an acidic aqueous solution of pH of around 3 since the base polymer used contains a carboxyl group in the molecule thereof. Therefore, they are of little utility for the above-described purpose in the paper manufacturing industry.

Further, where the adhesives contain a large amount of a plasticizer, the plasticizer migrates to paper to cause stains (bleed-through) during long-term preservation or under a high temperature and high humidity condition. Stains of paper due to bleeding of the plasticizer causes printing defects, adhesion defects, or appearance defects.

SUMMARY OF THE INVENTION

An object of the present invention is to provide a water-soluble or water-dispersible pressure-sensitive adhesive composition which exhibits satisfactory water solubility or water dispersibility even in an acidic aqueous solution of pH of about 3 and is free from bleeding of a plasticizer added in a large proportion which may cause printing defects or adhesion defects, and is therefore particularly suitable as an adhesive in the paper industry.

As a result of extensive investigations, it has now been found that a sulfonate-containing copolymer obtained from specific monomers has a low Tg and provides satisfactory pressure-sensitive adhesiveness by itself and that the sulfonate present in the copolymer as a polar group serves to exhibit excellent water solubility or water dispersibility even in an acidic aqueous solution of pH of about 3. The present invention has been completed based on this finding.

The present invention relates to a water-soluble or water-dispersible pressure-sensitive adhesive composition comprising, as a base polymer, a copolymer obtained from (a) from 20 to 99% by weight of an alkoxyethyl acrylate represented by formula (I):

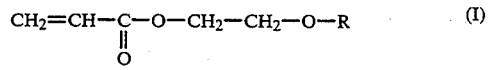

wherein R represents an alkyl group having from 1 to 4 carbon atoms, (b) from 1 to 30% by weight of a styrenesulfonic acid salt, and (c) up to 50% by weight of a monomer mixture of acrylic acid-caprolactone adducts represented by formula (II):

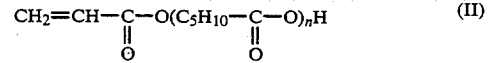

wherein n represents a number between 1 and 10 with its average being from 1 to 5, a homopolymer of said mixed acrylic acid-caprolactone adduct having a Tg of not more than $-10°$ C.

The sulfonate-containing copolymer used as a base polymer in the present invention contributes to satisfactory water-solubility or water-dispersibility even in an acidic aqueous solution of pH of abound 3 and exhibits satisfactory pressure sensitivity at room temperature either alone or, if desired, in combination with only a small proportion of a water-soluble or water-dispersible plasticizer. Therefore, the pressure-sensitive adhesive composition containing such a specific copolymer is free from bleeding of a plasticizer which causes printing defects, adhesion defects, or appearance defects and is very suited for use in the paper industry.

DETAILED DESCRIPTION OF THE INVENTION

The alkoxyethyl acrylate represented by the formula (I) (hereinafter referred to as "monomer (a)") provides, when homopolymerized, a polymer having a Tg of not more than $-10°$ C., and preferably not more than $-20°$ C., and effectively contributes to pressure-sensitive adhesiveness and water solubility or dispersibility.

The styrenesulfonic acid salt (hereinafter referred to as "monomer (b)") preferably contains a sulfonate group at the p-position of the styrene nucleus. Monomer (b) includes alkali metal salts, such as a sodium salt and a potassium salt, and various water-soluble metallic salts. The sulfo group being strongly acidic, monomer (b) provides a copolymer having satisfactory water solubility or dispersibility even in an acidic aqueous solution of pH of about 3. To the contrary, the conventionally employed carboxyl-containing monomers, such as acrylic acid, methacrylic acid, itaconic acid, and maleic acid, hardly provide a polymer having satisfactory solubility or dispersibility in an acidic aqueous solution (pH=ca. 3) due to weak acidity of the carboxyl group.

The monomer mixture represented by the formula (II) (hereinafter referred to as "monomer (c)") is an optional monomer which may be used for adjustment of adhesion characteristics, such as adhesive strength and cohesive strength, and water-solubility or dispersibility. Since the compound of the formula (II) contains a polymerizable carbon-to-carbon double bond and a carboxyl group at a distance, an addition polymer of the compound would have such a molecular structure in which a carboxyl group side chain is bonded at a considerable distance from the main chain, which contributes to reduction of Tg.

The sulfonate-containing copolymer of the present invention is prepared by copolymerization of a monomer mixture of monomers (a), (b), and (c). The monomer mixture to be used comprises from 20 to 99% by weight, and preferably from 60 to 99% by weight, of monomer (a), from 1 to 30% by weight, and preferably from 3 to 15% by weight, of monomer (b), and up to 50% by weight, and preferably from 10 to 30% by weight, of monomer (c).

If the weight proportion of monomer (a) is less than 20%, water-solubility or dispersibility and pressure-sensitive adhesion of the resulting copolymer would be insufficient. If it exceeds 99%, which means that the proportion of monomer (b) is less than 1%, the water-solubility or dispersibility of the resulting copolymer in an acidic aqueous solution is deteriorated. If the weight proportion of monomer (b) exceeds 30%, the copolymer would have an increased Tg, resulting in deterioration of pressure-sensitive adhesion. If the weight proportion of monomer (c) exceeds 50%, either one or both of the expected characteristics, i.e., pressure-sensitive adhesion and solubility or dispersibility in an acidic aqueous solution, would be reduced.

Copolymerization of monomers (a), (b), and (c) may be carried out by any of generally employed radical polymerization techniques, such as bulk polymerization, solution polymerization, emulsion polymerization, and suspension polymerization. Polymerization initiators which can be used include azo compounds, such as azobisisobutyronitrile and azobisvaleronitrile; peroxides, such as benzoyl peroxide and lauroyl peroxide; and persulfates, such as ammonium persulfate and potassium persulfate. Redox catalysts composed of any of these polymerization initiators and a reducing agent, such as sodium hydrogensulfite, sodium ascorbate, and metallic salts, may also be employed.

The thus obtained sulfonate-containing copolymer usually has a Tg of not more than 0° C., and preferably of from $-10°$ to $-70°$ C. In other words, it is preferable to control polymerization conditions, such as a monomer mixing ratio, a polymerization temperature, and a polymerization time, so that the resulting copolymer may have a Tg within the above-recited range.

The sulfonate-containing copolymer of the present invention is capable of providing, by itself, a water-soluble or water-dispersible pressure-sensitive adhesive composition having satisfactory pressure sensitivity. If desired, in order to further improve the pressure-sensitive adhesion, the sulfonate-containing copolymer may be compounded with known water-soluble or water-dispersible plasticizers, such as polyether polyols, polyhydric alcohols, and alkanolamine salts of oxidized rosin. The amount of the known plasticizer to be compounded is usually not more than 200 parts by weight, preferably not more than 100 parts by weight, and more preferably not more than 50 parts by weight, per 100 parts by weight of the sulfonate-containing copolymer. Compounding of an excessive amount of the plasticizer results in the above-described problem as associated with the conventional pressure-sensitive adhesives.

When a water-soluble or water-dispersible pressure-sensitive adhesive is used for bonding paper in the paper manufacturing industry, it is frequently exposed to a high temperature and high humidity environment. Under such a condition, the adhesive has considerably reduced creep strength due to moisture absorption and softening and is liable to undergo cohesive failure under a small tension to cause trouble in paper manufacturing operations. Therefore, a pressure-sensitive adhesive, though required to be water soluble, is demanded to have resistance to moisture to some extent.

In order to meet this demand, the moisture resistance or cohesive force of the water-soluble or dispersible pressure-sensitive adhesive composition of the present invention may be improved by compounding a polyfunctional compound reactive with the functional group of the above-described sulfonate-containing copolymer.

The polyfunctional compound which can be used in the present invention is selected appropriately from epoxy compounds, melamine compounds, reactive phenol resins, polyvalent metal chelate compounds, and the like depending on the kind of the monomers constituting the sulfonate-containing copolymer.

Examples of suitable epoxy compounds to be compounded include triglycidyl isocyanurate. In addition, alicyclic glycidyl ester-, alicyclic glycidyl ether-, bisphenol- and aliphatic-type low-molecular weight epoxy compounds having a 1,2-epoxy group at the terminal may also be used. Specific examples of commercially available epoxy compounds are "Epikote #828" and "Epikote #1031" both produced by Chiba Geigy, "Epon #834" produced by Shell Chemical Co., "ECN "#1235" produced by Chiba Geigy, and "TEPIC" produced by Nissan Chemicals, Industries, Ltd.

Examples of suitable melamine compounds to be compounded include melamine and derivatives thereof, such as monomethylolmelamine, polymethylolmelamine (e.g., di-, tri-, tetra-, penta- or hexamethylolmelamine), and an alkylated methylolmelamine (e.g., methylated methylolmelamine, butylated methylolmelamine).

Examples of suitable reactive phenol resins include "TACKIROL #201" produced by Sumitomo Chemical Co., Ltd. Examples of the polyvalent metal chelate compounds include titanium acetylacetonate and ammonium titanium lactate.

These polyfunctional compounds are usually added in an amount of not more than 10 parts by weight per 100 parts by weight of the sulfonate-containing copolymer. Addition of a higher level of the polyfunctional compound impairs water solubility of the adhesive composition.

If desired and necessary, the water-soluble or dispersible pressure-sensitive adhesive composition of the present invention may further contain known compounding additives, such as colorants, fillers, and antioxidants. If particularly desired, the composition may furthermore contain a water-soluble tackifier, such as an alkali metal salt, an ammonium salt, or a polyether ester of rosin, disproportionated rosin, hydrogenated rosin, etc.

The water-soluble or dispersible pressure-sensitive adhesive composition according to the present invention always exhibits pressure-sensitive adhesion and has satisfactory solubility or dispersibility in an acidic aqueous solution of pH of about 3 as well as a neutral or alkaline aqueous solution. Accordingly, a pressure-sensitive adhesive tape obtained by coating the adhesive composition on one or both sides of a water-soluble or dispersible substrate tape made of Japanese paper, rayon, nonwoven fabric, etc., is very suitable for use in the paper manufacturing industry. The adhesive tape does not cause printing defects or adhesion defects which are ascribed to migration of a plasticizer used in a large quantity.

The adhesive composition of the present invention is also suitably applicable to adhesive labels, adhesive tapes for fixing of sanitary napkins, and the like. It is also useful as a self-adhesive for general use. The adhesive tapes or sheets obtained by coating the adhesive composition of the present invention on one or both sides of a substrate made of, e.g., polyvinyl chloride, polyethylene, or polypropylene, or polyethylene-laminated paper are advantageous in that any remainder of the adhesive if left on an adherent after peeling can easily be removed by water.

The present invention is now illustrated in greater detail with reference to Examples, but it should be understood that the present invention is not deemed to be limited thereto. All the parts and percents are by weight unless otherwise indicated.

EXAMPLE 1

A mixture of 95 parts of methoxyethyl acrylate, 5 parts of sodium styrenesulfonate, 300 parts of water, 100 parts of methanol, and 0.175 part of ammonium persulfate was copolymerized in a three-necked flask at 60° C. for 5 hours while purging with nitrogen to prepare a pressure-sensitive adhesive composition having a polymer content of about 20% and a solution viscosity of 30 poise. The resulting sulfonate-containing copolymer had a Tg of $-35°$ C.

EXAMPLE 2

A mixture of 55 parts of methoxyethyl acrylate, 5 parts of sodium styrenesulfonate, 40 parts of an acrylic acid-caprolactone adduct of formula (II) (n ranged from 1 to 5, with its average being about 1.8) ("ARONIX M-5300" produced by Toa Gosei Chemical Industry Co., Ltd.), 7.48 parts of potassium hydroxide, 96 parts of water, 144 parts of methanol, and 0.175 part of azobisisobutyronitrile was copolymerized in the same manner as in Example 1 to prepare a pressure-sensitive adhesive composition having a polymer content of about 30% and a solution viscosity of 70 poise. The resulting sulfonate-containing copolymer had a Tg of $-33°$ C.

EXAMPLE 3

A mixture of 90 parts of ethoxyethyl acrylate, 10 parts of potassium styrenesulfonate, 100 parts of water, 200 parts of methanol, and 0.2 part of ammonium persulfate was copolymerized in the same manner as in Example 1 to prepare a pressure-sensitive adhesive composition having a polymer content of about 25% and a solution viscosity of 40 poise. The resulting sulfonate-containing copolymer had a Tg of $-33°$ C.

EXAMPLE 4

A mixture of 85 parts of methoxyethyl acrylate, 5 parts of sodium styrenesulfonate, 300 parts of water, 100 parts of methanol, and 0.175 part of ammonium persulfate was copolymerized in the same manner as in Example 1 to prepare a polymer solution having a solid content of about 18% and a solution viscosity of 40 poise. The resulting sulfonate-containing copolymer had a Tg of $-33°$ C. 10 Parts of a water-soluble rosin salt per 100 parts of the polymer were added to the polymer solution to prepare a pressure-sensitive adhesive composition.

Comparative Example 1

To 100 parts of a polyacrylic acid aqueous solution (product of Wako Pure Chemical Industries, Ltd.; solid content: 25%; solution viscosity: ca. 100 poise) was added 400 parts of a water-soluble plasticizer ("SANNIX SP750" produced by Sanyo Kasei Co., Ltd.) to prepare a comparative pressure-sensitive adhesive composition.

Comparative Example 2

A mixture of 95 parts of methoxyethyl acrylate, 5 parts of acrylic acid, 3.89 parts of potassium hydroxide, 300 parts of water, 100 parts of methanol, and 0.175 part of ammonium persulfate was copolymerized in the same manner as in Example 1 to prepare a comparative pressure-sensitive adhesive composition having a polymer content of about 20% and a solution viscosity of 35 poise. The resulting copolymer had a Tg of $-37°$ C.

Each of the pressure-sensitive adhesive compositions obtained in Examples 1 to 5 and Comparative Examples 1 and 2 was tested according to the following test methods. The test results obtained are shown in Table 1 below.

1) Water-Solubility:

The adhesive composition was coated on release paper to a dry thickness of 50 $\mu$m, and the adhesive layer was transferred to both sides of Japanese paper to prepare a double-coated adhesive sheet. The sheet was cut to a strip of 20 mm × 200 mm.

The strip was put in 300 ml of aqueous solution (pH=3 or 9) at 20°±2° C. and stirred therein for 1 minute by means of a commercially available juicer. The solution was filtered through filter paper. Water-solubility of the adhesive composition was rated "good" when no undissolved matter remained on the filter paper and "bad" when any undissolved matter remained.

2) Bleed Resistance:

The adhesive composition was coated on one side of a 50 μm thick polyester film to a dry thickness of 50 μm and dried to prepare a pressure-sensitive adhesive sheet. The adhesive sheet was adhered onto fine paper (basis weight: 45 g/m²; thickness: 30 μm) and allowed to stand under a load of 600 g/cm² in a chamber set at a temperature of 35° C. and a relative humidity (RH) of 85±3% for 7 days. The bleed resistance of the adhesive sheet was evaluated by observing bleeding of the plasticizer on the fine paper and rated according to the following standard.

Good . . . No bleed-through was observed at all.
Medium . . . Slight bleed-through was observed on the upper surface of the fine paper.
Poor . . . Bleed-through was observed all over the fine paper.

3) Adhesive Strength:

The pressure-sensitive adhesive sheet prepared in 2) above was cut to a 20 mm wide and 150 mm long strip.

A steel plate (Class 27, SUS 27CP, specified in JIS G4305) was cut to a size of 50 mm in width, 125 mm in length, and 2.0 mm in thickness, and the surface of each cut plate was sufficiently polished with wet abrasive paper (#280, specified in JIS R6253).

The adhesive strip was adhered onto the polished surface of the steel plate by giving a stroke of a 2 kg rubber roller. After allowing the strip to stand for about 30 minutes, an adhesive strength was measured with a Schopper tensile tester at a pulling speed of 300 mm/min and at a peel angle of 180°. The adhering and measurement were made at 23° C. and 65% RH.

TABLE 1

| Example No. | Water Solubility pH 3 | Water Solubility pH 9 | Bleed Resistance | Adhesive Strength (g/20 mm) |
|---|---|---|---|---|
| Example 1 | good | good | good | 900 |
| Example 2 | good | good | good | 1200 |
| Example 3 | good | good | good | 950 |
| Example 4 | good | good | good | 1250 |
| Example 5 | good | good | good | 1000 |
| Comparative Example 1 | bad | good | bad | 840 |
| Comparative Example 2 | bad | good | good | 800 |

As is apparent from the results in Table 1, the pressure-sensitive adhesive composition according to the present invention exhibits excellent pressure-sensitive adhesiveness without the aid of a water-soluble or water-dispersible plasticizer and, therefore, shows excellent bleed resistance. Moreover, they are satisfactorily soluble or re-dispersible even in an aqueous solution of pH of from about 3 to about 9.

While the invention has been described in detail and with reference to specific examples. thereof, it will be apparent to one skilled in the art that various changes and modifications can be made therein without departing from the spirit and scope thereof.

What is claimed is:

1. A pressure-sensitive adhesive tape comprising a tape-like substrate having provided on at least one side thereof a water-soluble or water-dispersible pressure-sensitive adhesive composition comprising a copolymer comprising:
   (a) 20 to 99% by weight of an alkoxyethyl acrylate represented by formula (I):

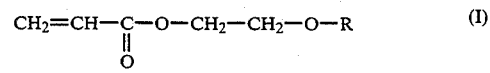

wherein R represents an alkyl group having from 1 to 4 carbon atoms,
   (b) 1 to 30% by weight of a styrenesulfonic acid salt comprising an alkali metal salt, and
   (c) 10 to 40% by weight of a monomer mixture of acrylic acid-caprolactone adducts represented by formula (II):

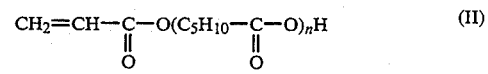

wherein n represents a number between 1 and 5, a homopolymer of said mixed acrylic acid-caprolactone adduct having a glass transition temperature of not more than −10° C.

2. A pressure sensitive adhesive tape as claimed in claim 1, wherein said alkoxyethyl acrylate is a monomer providing a homopolymer having a glass transition temperature of not more than −10° C.

3. A pressure sensitive adhesive tape as claimed in claim 1, wherein said copolymer has a glass transition temperature of from −10° C. to −70° C.

4. A pressure-sensitive adhesive tape as claimed in claim 1, wherein said composition further comprises a polyfunctional compound selected from the group consisting of epoxy compounds, melamine compounds, reactive phenol resins, and polyvalent metal chelate compounds.

5. A pressure-sensitive adhesive tape as claimed in claim 4, wherein said polyfunctional compound is present in an amount of not more than 10 parts by weight per 100 parts by weight of the copolymer.

6. A pressure-sensitive adhesive tape as claimed in claim 1, wherein the alkoxyethyl acrylate represented by formula (I) is present in an amount of 60–99% by weight.

7. A pressure-sensitive adhesive tape as claimed in claim 1, wherein the styrenesulfonic acid salt is present in an amount of 3 to 15% by weight.

8. A pressure-sensitive adhesive tape as claimed in claim 1, wherein the monomer mixture of acrylate acid-caprolactone adducts represented by formula (II) is present in an amount of 10 to 30% by weight.

9. A pressure-sensitive adhesive tape as claimed in claim 1, wherein said substrate is a water-soluble or water-dispersible substrate.

10. A pressure-sensitive adhesive tape as claimed in claim 1, which is used for a bonding paper.

* * * * *